US 7,561,742 B2

(12) United States Patent
Boose et al.

(10) Patent No.: US 7,561,742 B2
(45) Date of Patent: Jul. 14, 2009

(54) APPARATUS AND METHODS FOR CONVERTING RASTER ILLUSTRATED PARTS IMAGES INTO INTELLIGENT VECTOR-LAYERED FILES

(75) Inventors: Molly L. Boose, Bellevue, WA (US); David B. Shema, Seattle, WA (US); Lawrence S. Baum, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 105 days.

(21) Appl. No.: 11/534,471

(22) Filed: Sep. 22, 2006

(65) Prior Publication Data

US 2007/0064013 A1  Mar. 22, 2007

Related U.S. Application Data

(62) Division of application No. 10/318,921, filed on Dec. 13, 2002, now Pat. No. 7,233,698.

(51) Int. Cl.
*G06K 9/46* (2006.01)
*G06K 9/66* (2006.01)

(52) U.S. Cl. .................................................. 382/190

(58) Field of Classification Search ........................ None
See application file for complete search history.

(56) References Cited

U.S. PATENT DOCUMENTS

| | | | |
|---|---|---|---|
| 4,843,569 A | | 6/1989 | Sawada |
| 5,404,435 A | * | 4/1995 | Rosenbaum ................. 715/515 |
| 5,761,328 A | * | 6/1998 | Solberg et al. .............. 382/113 |
| 5,784,490 A | * | 7/1998 | Akra et al. ................... 382/215 |
| 5,845,288 A | * | 12/1998 | Syeda-Mahmood ......... 707/102 |
| 5,963,966 A | * | 10/1999 | Mitchell et al. ............. 715/513 |
| 6,006,232 A | * | 12/1999 | Lyons ........................ 707/101 |
| 6,134,338 A | * | 10/2000 | Solberg et al. .............. 382/113 |
| 6,336,124 B1 | * | 1/2002 | Alam et al. ................. 715/523 |

(Continued)

FOREIGN PATENT DOCUMENTS

EP  0 284 764  10/1988

OTHER PUBLICATIONS

Worring et al, "Automatic Indexing of Text and Graphics in Technical Manuals", Multimedia and Expo, 2001, IEEE Conf. ICME 2001, Aug. 22-25, 2001, pp. 1156-1159.*

(Continued)

*Primary Examiner*—Matthew C Bella
*Assistant Examiner*—Yuzhen Ge
(74) *Attorney, Agent, or Firm*—Harness, Dickey & Pierce, P.L.C.

(57) ABSTRACT

Apparatus and methods for converting raster illustrated parts images into intelligent vector-layered files. The method involves recognizing and removing reference labels from the raster illustrated parts image to produce a reference label scrubbed file. Reference lines are recognized and removed from the reference label scrubbed file to produce a scrubbed file. The scrubbed file includes a reusable base graphic. The scrubbed file is converted to a vector file in which the reusable base graphic is embedded. One or more vector layers are added to the vector file to produce the intelligent vector-layered file. Each vector layer includes vector elements corresponding to one of the recognized reference labels and its one or more reference lines.

20 Claims, 12 Drawing Sheets

U.S. PATENT DOCUMENTS

| | | | |
|---|---|---|---|
| 6,621,941 B1 * | 9/2003 | Syeda-Mahmood et al. | 382/306 |
| 6,766,331 B2 * | 7/2004 | Shema et al. | 707/102 |
| 6,826,305 B2 * | 11/2004 | Zhu | 382/172 |
| 6,941,000 B2 | 9/2005 | Wong | |
| 6,961,897 B1 * | 11/2005 | Peel et al. | 715/501.1 |
| 7,058,623 B2 | 6/2006 | Wong | |
| 2002/0006224 A1 | 1/2002 | Wong | |
| 2002/0015525 A1 * | 2/2002 | Fujiwara | 382/182 |
| 2004/0114801 A1 | 6/2004 | Boose | |
| 2004/0151377 A1 | 8/2004 | Boose | |

OTHER PUBLICATIONS

Agam and Dinstein: Directional Decomposition of Line-Drawing Images Based on Regulated Morphological Operations; Lecture Notes in Computer Science 1389, Karl Tombre and Atul K. Chhabra (Eds.); Graphics Recognition Algorithms and Systems; Second International Workshop, GREC'97, Nancy, France, (pp. 21-34) (1997).

Doermann, "An Introduction to Vectorization and Segmentation," Language and Media Processing Laboratory; Institute for Advanced Computer Studies; University of Maryland, College Park, MD, (pp. 1-8) (1997).

Dori et al., Handbook of Character Recognition and Document Image Analysis, Chapter 16, "The Representation of Document Structure: a Generic Object-Process Analysis;" World Scientific Publishing Company, (pp. 421-456) (1996).

Elliman; A Really Useful Vectorization Algorithm; Lecture Notes in Computer Science 1941, Atul K. Chhabra and Dov Dori (Eds.); Graphics Recognition Recent Advances; Third International Workshop, GREC'99, Jaipur, India, (pp. 19-27) (1999).

Kitahashi, "Media Information processing in documents-generation of manuals of mechanical parts assembling", Proceedings of the 4th International Conference on Document Anaylsis and Recognition (ICDAR). Ulm, Germany, Aug. 18-20, 1997, Proceedings of the ICDAR, Los Alamitos, IEEE Comp. Soc., US, vol. II, Aug. 18, 1997, pp. 792-796, XP010244839, ISBN: 0-8186-7898-4.

Tombre et al., Stable and Robust Vectorization: How to Make the Right Choices; Lecture Notes in Computer Science 1941, Atul K. Chhabra and Dov Dori (Eds.); Graphics Recognition Recent Advances; Third International Workshop, GREC'99, Jaipur, India, (pp. 3-18) (1999).

* cited by examiner

| | | | | |
|---|---|---|---|---|
| DL | H | 1120 | 2540 | |
| IN | 366 | 1695 | 2340 | |
| LL | 1687 | 2336 | 1458 | 2156 |
| IN | 127 | 1511 | 2312 | |
| LL | 1505 | 2309 | 1422 | 2240 |
| IN | 275 | 921 | 2281 | |
| LL | 913 | 2278 | 612 | 2074 |
| LO | M | 1739 | 2250 | |
| LL | 1737 | 2245 | 1617 | 2154 |
| LO | K | 918 | 2171 | |
| LL | 913 | 2173 | 807 | 2116 |
| IN | 255 | 34 | 2138 | |
| LL | 107 | 2140 | 239 | 2082 |
| IN | 493 | 1835 | 2097 | |
| LL | 1820 | 2101 | 1632 | 2076 |
| IN | 295 | 924 | 2077 | |
| LL | 914 | 2083 | 790 | 2056 |

11 PIXEL RUNS
(LENGTH 3)

APPARATUS AND METHODS FOR CONVERTING RASTER ILLUSTRATED PARTS IMAGES INTO INTELLIGENT VECTOR-LAYERED FILES

CROSS-REFERENCE TO RELATED APPLICATIONS

This application is a divisional of U.S. patent application Ser. No. 10/318,921 filed on Dec. 13, 2002. The disclosure of the above application is incorporated herein by reference.

COPYRIGHT NOTICE

A portion of the disclosure of this document contains material that is subject to copyright protection. The copyright owner has no objection to the facsimile reproduction by anyone of the patent disclosure, as it appears in the U.S. Patent and Trademark Office patent files or records, but otherwise the copyright owner reserves all copyright rights whatsoever.

FIELD OF THE INVENTION

The present invention relates to raster illustrated part images, and more particularly to apparatus and methods for converting raster illustrated parts images into intelligent vector-layered files.

BACKGROUND OF THE INVENTION

Illustrated parts drawings identify a hierarchy of details or assemblies and parts in a manner showing how the details and parts fit together. Illustrated parts drawings may show multiple details such as the exemplary illustrated parts drawing shown in FIG. 1 that includes three details labeled G, H and I. Typically, the details include references or items numbers that are indexes into a parts list where additional information about the assemblies and parts is available. A single illustrated parts drawing can include many details with dozens of item numbers.

It is a common practice to use illustrated parts drawings with task lists. A task list specifies construction or maintenance steps, where each step references one or more the parts on the illustrated parts drawing. For a particular step, a user typically must search the drawing for the parts referenced in the step to view the part and how it relates to other parts. However, searching for the part can be time-consuming and prone to errors, especially as the number of parts contained in the illustrated parts drawing increases.

An existing method of improving the usability of electronic illustrated parts images with task lists is to separate the various images of the illustrated parts drawings for each step of the task list and then identify only the details and parts referenced in that step. In this method, the same base drawing is used repeatedly but with only the relevant, and different, parts being identified each time. This method immediately draws the user's attention to the parts or items on the drawing that are relevant to the current step of the task list. For example, FIG. 2 shows an illustrated parts image being used with an exemplary task list. As shown in FIG. 2, the illustrated parts image identifies only the parts or items relevant to or mentioned in the current task list step (i.e., "Remove bolts, washers, and nuts"). Although this method has proved successful for its intended purpose, the cost of manually creating and maintaining numerous slightly modified versions of the same drawing, however, is prohibitively expensive.

Another method of improving the usability of electronic illustrated parts images is to provide an illustrated parts image with one or more intelligent objects. Indeed, existing computer software programs and tools allow for the authoring of intelligent illustrated parts images with intelligent objects and constructs, such as item numbers and locators. By way of example only, an illustrated parts image may be provided with an item number that is disposed at the end of a reference line (e.g., lead line, leader line, arrow, bulleted line, etc.) and that is associated with a link or index to database information about the particular component or part referenced by the item number. Accordingly, a user-click on an item number queries a database and thus allows the user to access database information associated with the item number. As another example, an illustrated parts image may be provided with a locator. As before with item numbers, a locator is also disposed at the end of a reference line. However, a locator is associated with zooming functionality that allows a user to zoom in on a particular portion (e.g., component, part, detail, assembly, etc.) of the illustrated parts drawing with a user-click on the locator. Accordingly, both item numbers and locators allow a user to access additional information by way of a user-click thereon.

However, there are many existing illustrated parts drawings that comprise unintelligent raster images (bitmapped graphics) that do not provide high-level structures, such as text records or graphical primitives. For at least this reason, raster illustrated part images have had very limited functionality in electronic information systems.

SUMMARY OF THE INVENTION

Accordingly, the inventors have recognized a need in the art for devices and methods that improve the usability and functionality of raster illustrated parts images by converting existing raster illustrated parts images into intelligent vector-layered files in a highly accurate, efficient, and automated batch process that requires little to no user intervention.

The present invention is directed to a system and method for converting raster illustrated parts images into intelligent vector-layered files. The method generally involves recognizing and removing reference labels from the raster illustrated parts image to produce a reference label scrubbed file. Reference lines are recognized and removed from the reference label scrubbed file to produce a scrubbed file, which includes a reusable base graphic. The scrubbed file is converted to a vector file in which the reusable base graphic is embedded as a bitmap. One or more vector layers are added to the vector file to produce an intelligent vector-layered file. Each vector layer includes vector elements corresponding to one of the recognized reference labels and its one or more reference lines.

Further areas of applicability of the present invention will become apparent from the detailed description provided hereinafter. It should be understood that the detailed description and specific examples, while indicating at least one preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Corresponding reference characters indicate corresponding features throughout the drawings.

DETAILED DESCRIPTION OF THE PREFERRED EMBODIMENTS

The following description of the preferred embodiments is merely exemplary in nature and is in no way intended to limit the invention, its application, or uses.

Figure 3:
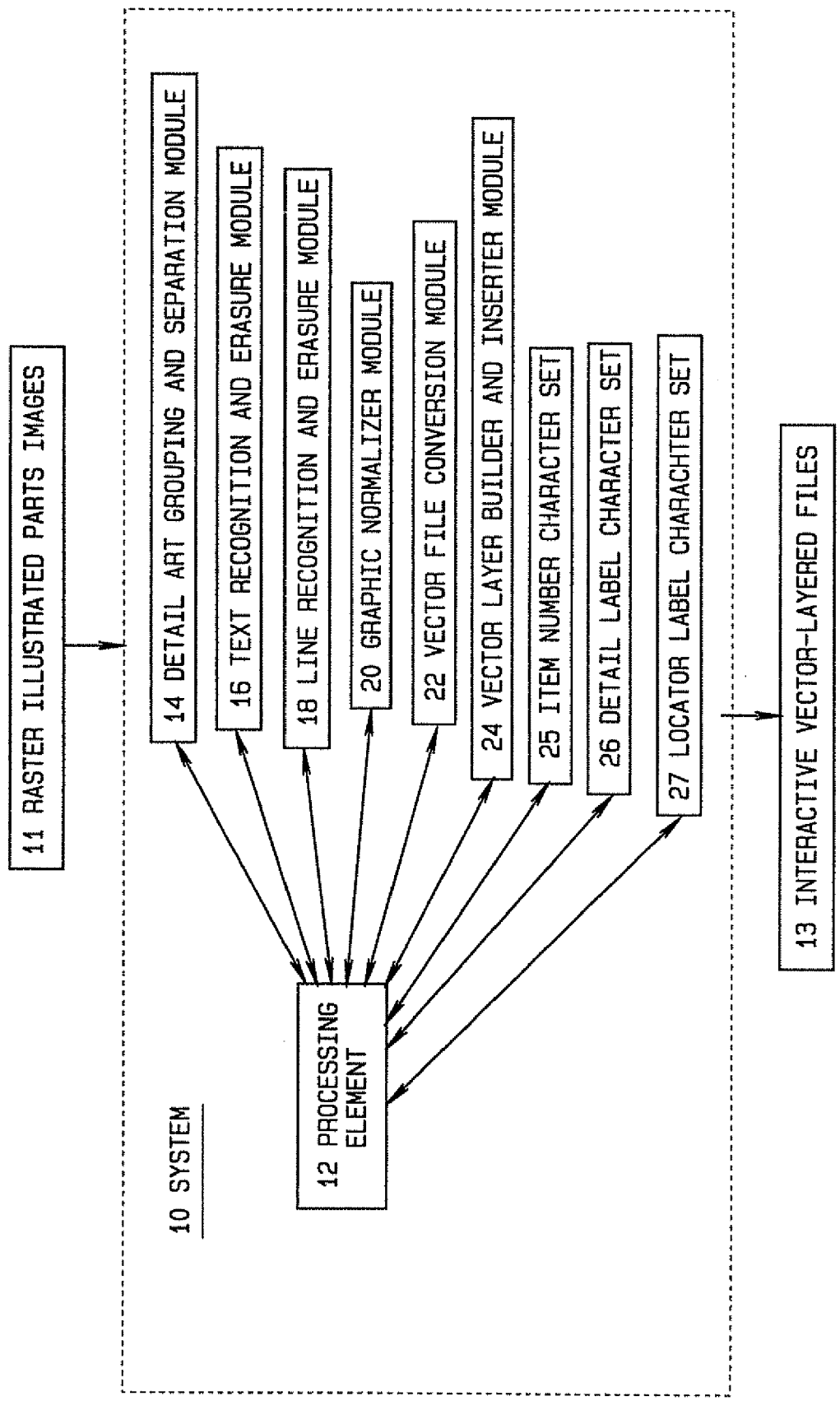
FIG. 3 is a simplified block diagram of a system in accordance with a preferred embodiment of the present invention.

Referring to FIG. 3, there is shown a control system 10 in accordance with a preferred embodiment of the present invention. Generally, the system 10 converts raster illustrated parts images 11 into one or more intelligent vector-layered files 13 in a substantially automated batch process. Each intelligent vector-layered file 13 includes a reusable base graphic and a vector layer for each item number and locator. Each vector layer also includes the reference line(s) associated with the corresponding item number or locator.

For ease of identification and description and not for purposes of limitation, the term "reference label" as used herein shall be construed to include both item numbers and locators. In addition, the term "reference line" as used herein shall be construed to include any of a wide range of lines regardless of whether the line has an end designator, including but not limited to arrows, lead lines, leader lines, bulleted lines (i.e., lines with bullets as end designators), among others.

Figure 4A:
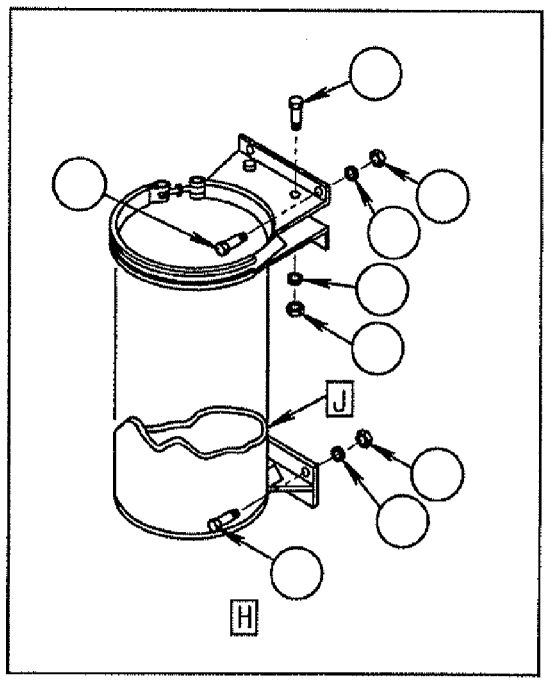
FIG. 4A is an intelligent vector-layered image with all reference labels identified.
Figure 4B:
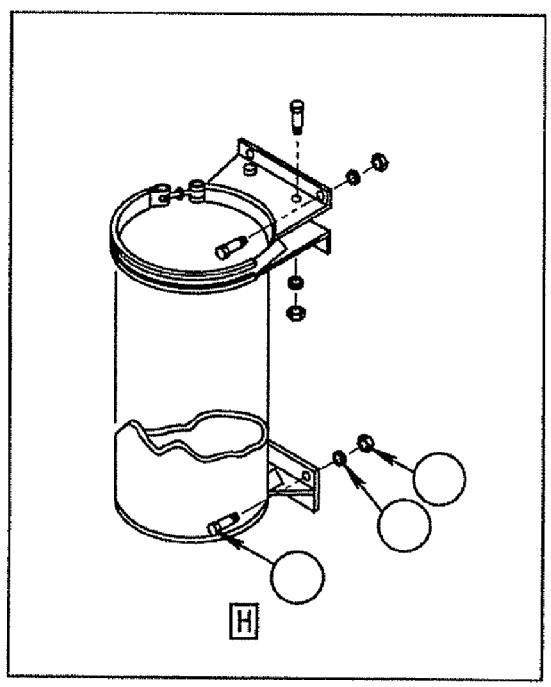
FIG. 4B is the image in 4A with only reference labels relevant to a specific task visible.

The vector layers are preferably encoded in a file format that is compatible with existing electronic or drawing management systems to allow authors to link vector layers to related steps of a task list. At runtime, the vector layers can be activated (i.e., made visible) or deactivated (i.e., made invisible) so that the items relevant to the current step are identified on the reusable base graphic. See FIGS. 4A and 4B. In other words, the reusable base graphic and various vector layers comprise an intelligent graphic, the display of which varies depending upon the content or particular step for which the graphics are being displayed.

Referring back to FIG. 3, the system 10 includes a suitable processing element 12 for performing the various operations required by the present invention. The processing element 12 is typically comprised of a combination of hardware (e.g., one or more microprocessors, other processing devices) and software that is stored by memory and executed by the hardware. In the illustrated embodiment, the processor 12 executes a detail art grouping and separation module 14, a text recognition and erasure module 16, a line recognition and erasure module 18, a graphic normalizer module 20, a vector file conversion module 22, and a vector layer builder and inserter module 24. However, it should be understood that the processing element 12 can be comprised of other combinations of hardware, software, firmware or the like so long as the resulting combination is capable of implementing the various operations required for converting raster illustrated images into one or more intelligent vector-layered files.

The system 10 also includes memory which may take the form of any suitable computer readable storage device. For example, the memory may comprise read only memory (ROM), random access memory (RAM), video memory (VRAM), hard disk, floppy diskette, compact disc (CD), an optical disk, magnetic tape, a combination thereof, etc. The memory may comprise computer readable media for storing such items as program code, software packages, programs, algorithms, information, data, files, databases, applications, among other things.

In the embodiment shown in FIG. 3, the system 10 includes the detail art grouping and separation module 14, the text recognition and erasure module 16, the line recognition and erasure module 18, the graphic normalizer module 20, the vector file conversion module 22, and the vector layer builder and inserter module 24. The plurality of modules 14 through 24 may be embodied in computer-readable program code stored in one or more computer-readable storage media operatively associated with the system 10.

It is to be understood, however, that the computer readable program code described herein can be conventionally programmed using any of a wide range of suitable computer readable programming languages that are now known in the art or that may be developed in the future. It is also to be understood that the computer readable program code described herein can include one or more functions, routines, subfunctions, and subroutines, and need not be combined in a single package but may instead be embodied in separate components. In addition, the computer readable program code may be a stand-alone application, or may be a plug-in module for an existing application and/or operating system. Alternatively, the computer readable program code may be integrated into an application or operating system. In yet another embodiment, the computer readable program code may reside at one or more network devices (not shown), such as an administrator terminal, a server, etc.

Although the present invention is described with the various modules 14 through 24 having a direct effect on and direct control of the system 10, it should be understood that it is the instructions generated by the execution of the programs 14 through 24 by the processing element 12, and the subsequent implementation of such instructions by the processing element 12, that have direct effect on and direct control of the system 10.

The system 10 further includes data and information specific to the set of raster illustrated parts images being converted. As shown, the system 10 includes a plurality of specially built textual character sets 25, 26, and 27, one set for the item numbers, one set for the detail labels, and one set for the locator labels. As explained in greater detail below, the character sets 25, 26, and 27 are used by the processing element 12 during detail art grouping and separation and during text recognition.

Figure 5A:
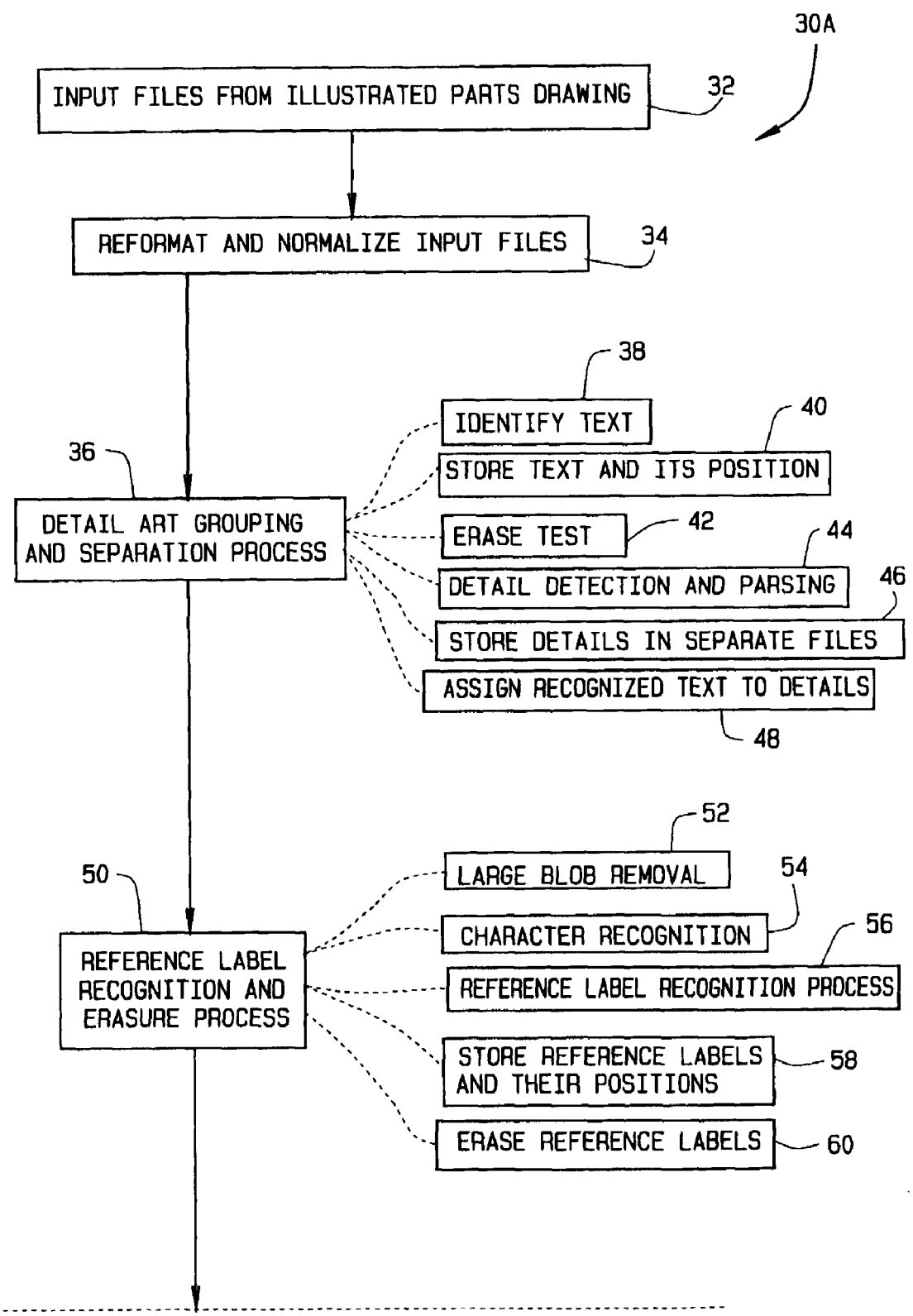
FIGS. 5A and 5B form a flowchart of the steps performed during a method for converting raster illustrated parts images into intelligent vector-layered files in accordance with a preferred embodiment of the present invention.
Figure 5B:
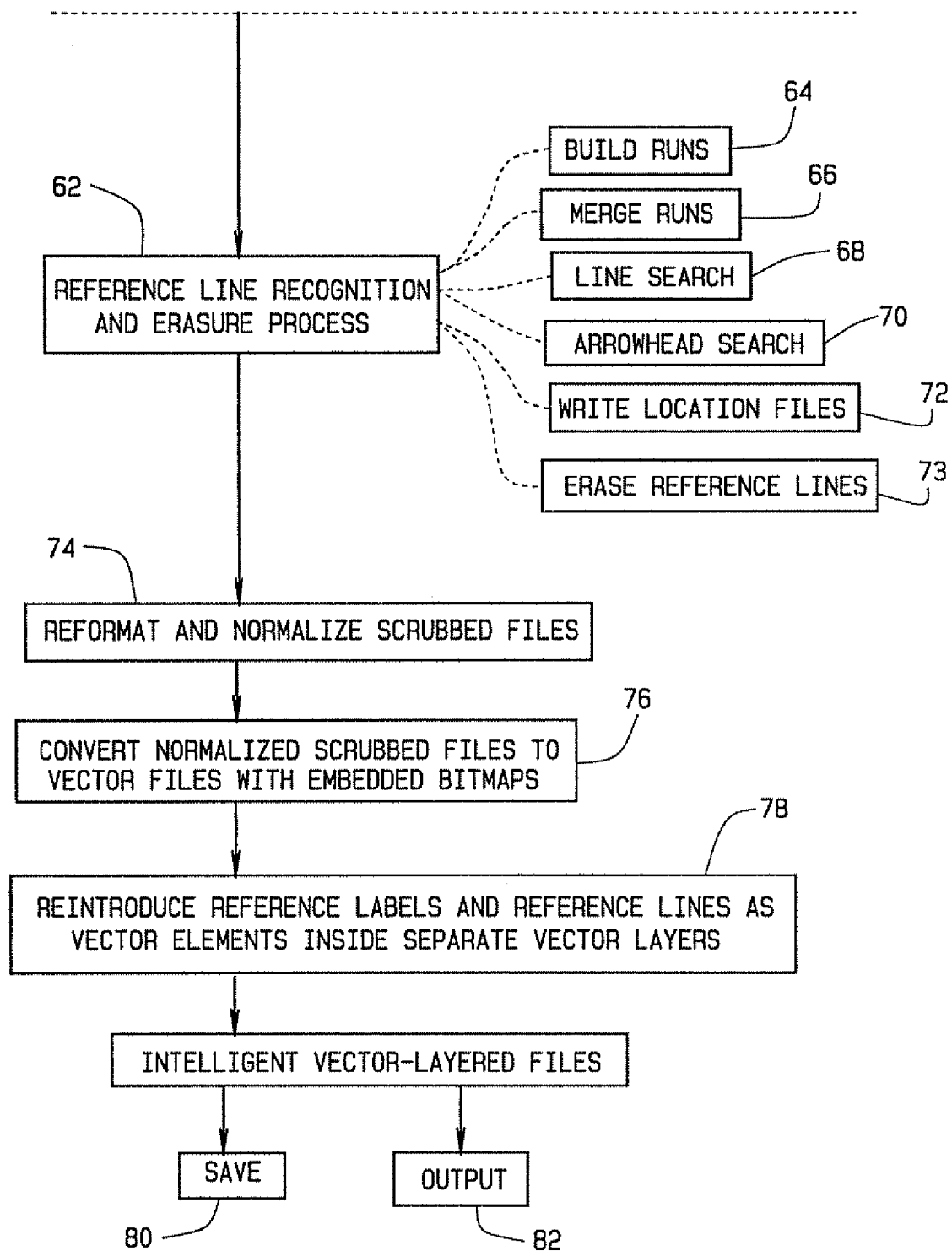
Figure 6:
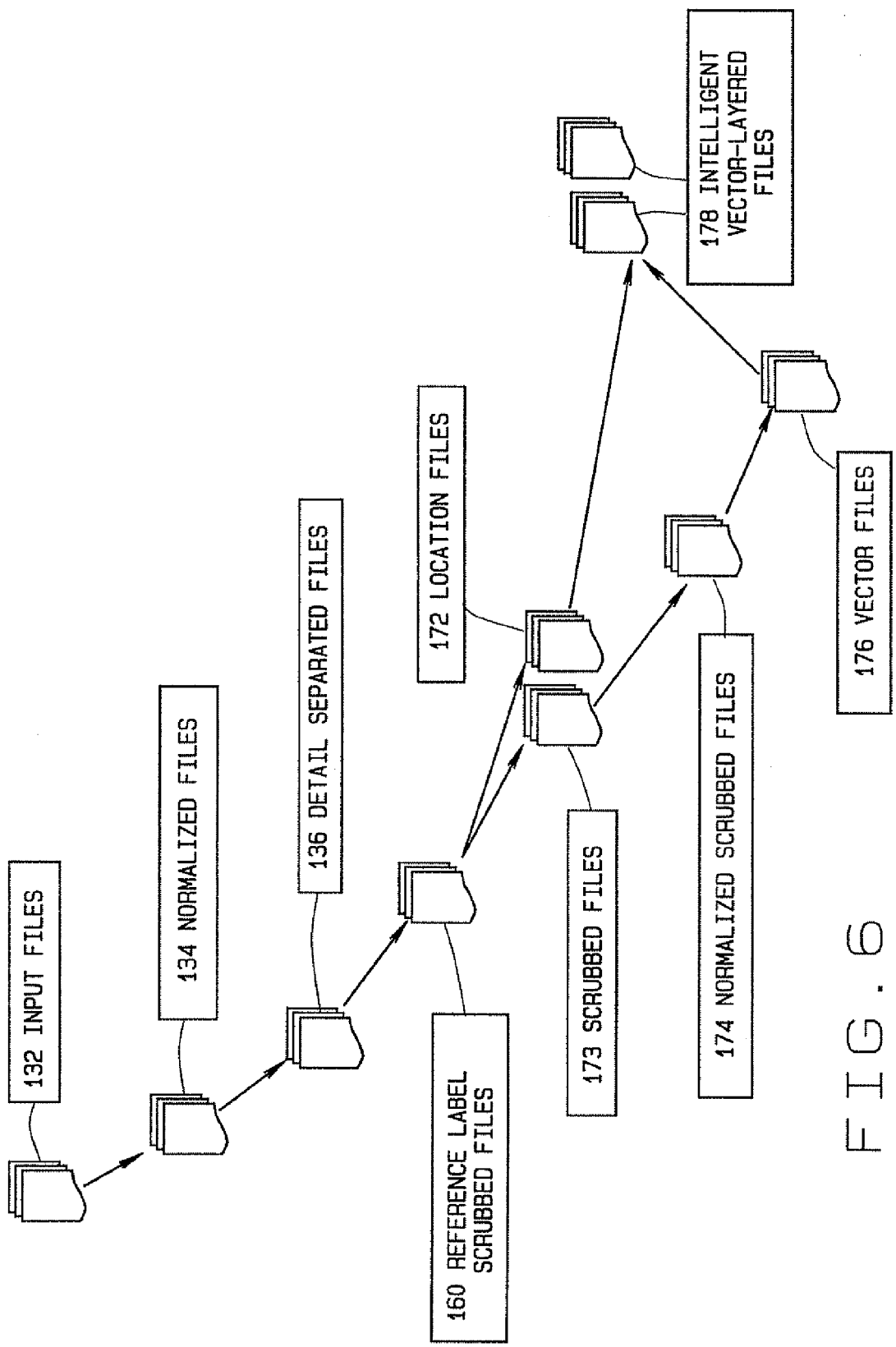
FIG. 6 is a process flow diagram of various files created and/or used during the method shown in FIGS. 5A and 5B.

A preferred method 30 implemented by the system 10 of the present invention is illustrated in simplified flow chart form in FIGS. 5A and 5B. FIG. 6 is a process flow diagram showing various files used and/or created during the method 30.

As shown in FIG. 5A, step 32 of method 30 comprises inputting one or more files 132 (FIG. 6) from the illustrated parts document 11 into the system 10. By way of example only, the files 132 input at step 32 may comprise uncompressed TIFF (tagged image file format) files having various resolutions (e.g., 300 dpi (dots per inch) to 700 dpi) and various color depths (e.g., color depth of 8 or 256 colors, etc.).

At step 34 (FIG. 5A), the system 10 executes the graphic normalizer module 20 (FIG. 3) to reformat and standardize each input file 132 (FIG. 6) to the same resolution, color depth, and compression. By way of example only, the files 134 (FIG. 6) normalized by the system 10 at step 34 may be compressed and converted to 300 dpi and 1 bit color (monochrome).

Step 36 (FIG. 5A) comprises a detail art grouping and separation process during which the system 10 executes the module 14 (FIG. 3) to separate the details within the normalized files 134 (FIG. 6) into individual or detail separated files 136. As shown in FIG. 5A, step 38 involves the system 10 accessing the character sets 25, 26, and 27 and using optical character recognition (ocr) to recognize the text (e.g., detail labels, locator labels, item numbers, etc.) within the raster illustrated parts images contained within the normalized files 134. At step 38, the system 10 may, for example, execute optical character recognition (OCR) software, such as Cartouche® OCR computer software from RAF Technology, Inc. of Redmond, Wash.

At step 40, the system 10 stores the recognized text and its corresponding locations. At step 42, the recognized text is removed or erased from the raster images within the normalized files 134.

At step 44, the system 10 detects and parses the individual details within the raster images of the normalized files 134 by using geometric proximity-based calculations in conjunction with the detail labels recognized at step 38. The system 10 uses the detail labels as starting points to identify pixels that are connected or grouped together. The system 10 preferably begins searching above the detail labels for the pixels to be grouped for each detail label. Each collection of grouped pixels may include the artwork forming the corresponding detail and its associated reference lines. Although the system 10 preferably separates ambiguous images (i.e., images that cannot be separated out with high confidence), the system 10 also preferably flags the ambiguous images to notify a user (e.g., illustrator, etc.) of the ambiguity.

Figure 1:
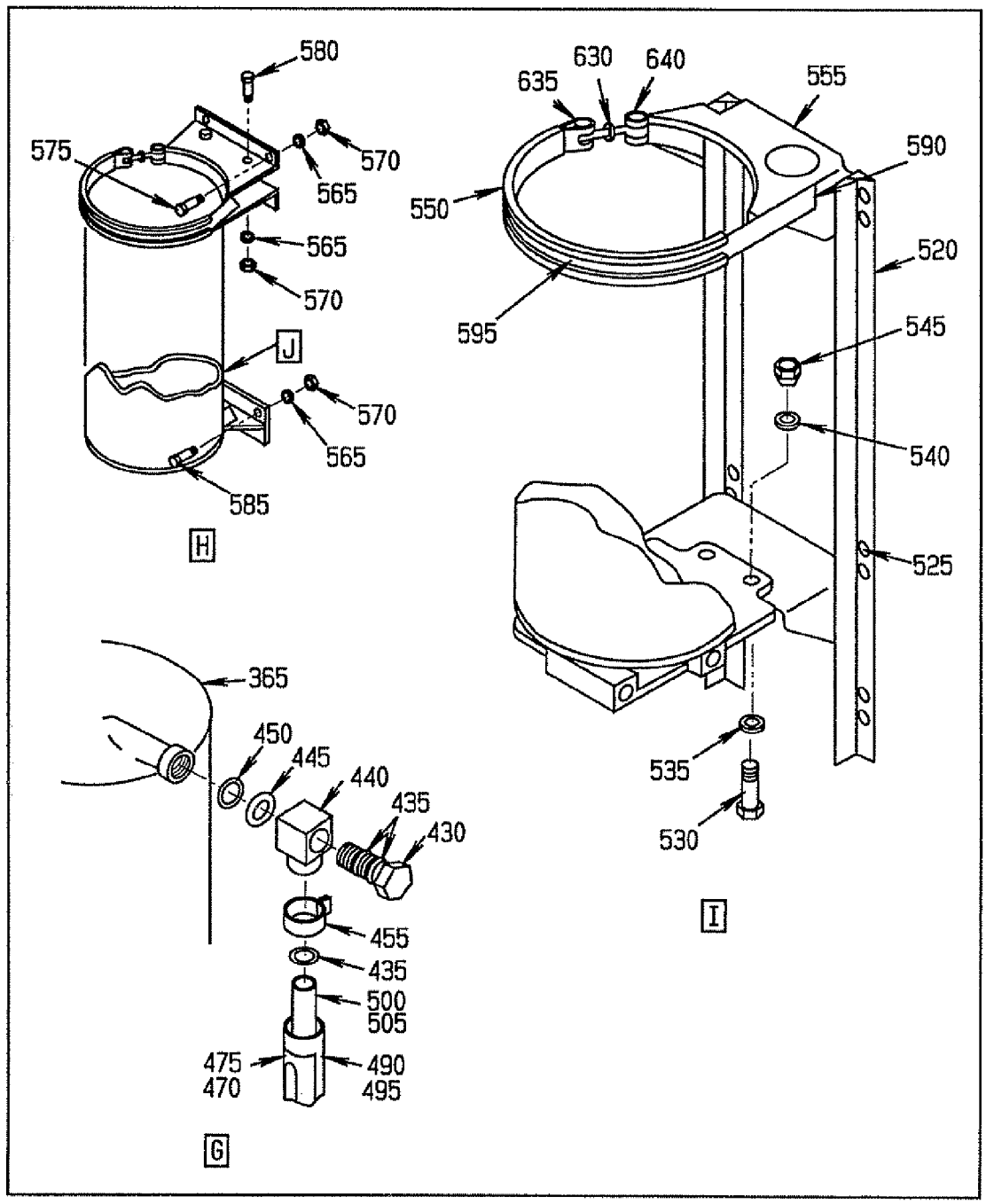
FIG. 1 is an exemplary raster illustrated parts image.
Figure 2:
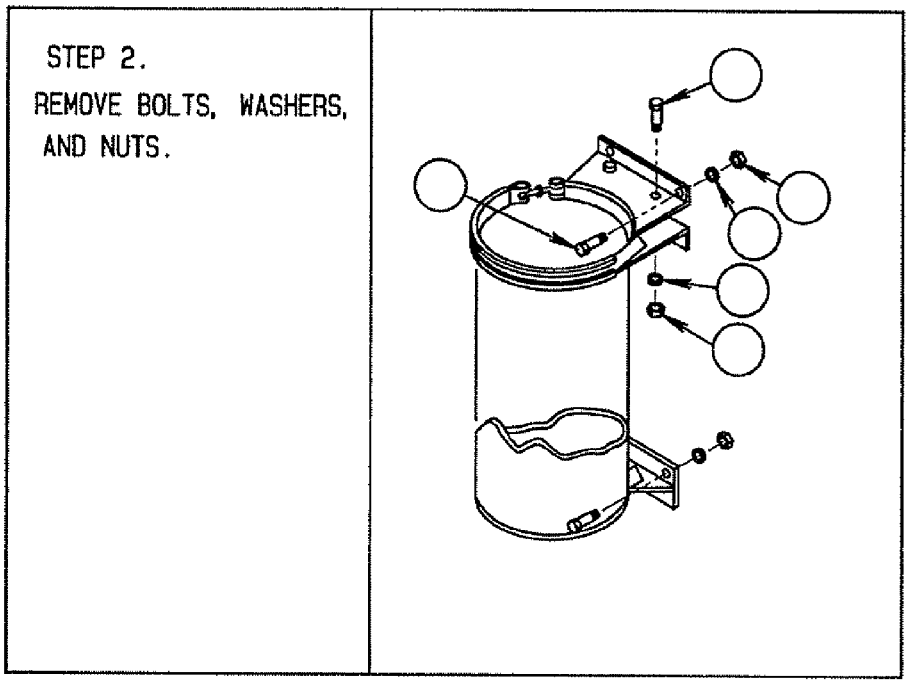
FIG. 2 illustrates an exemplary task list being used in conjunction with an exemplary illustrated parts image.
Figure 8A:
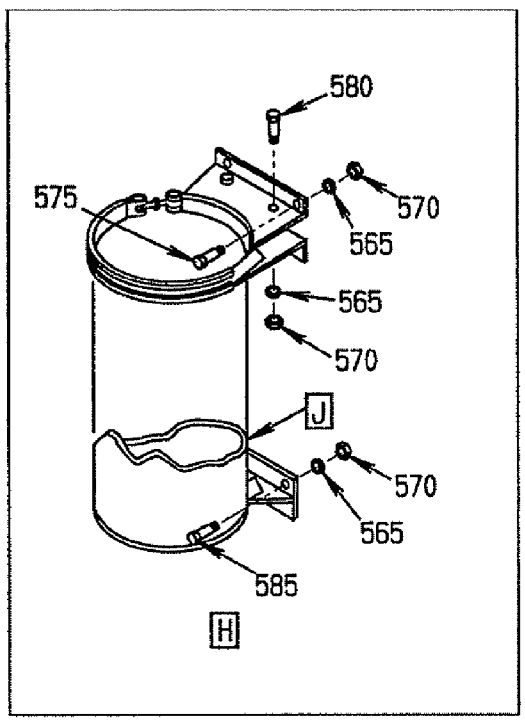
FIGS. 8A, 8B and 8C illustrate the results of the detail separation process on the image shown in FIG. 1.
Figure 8C:
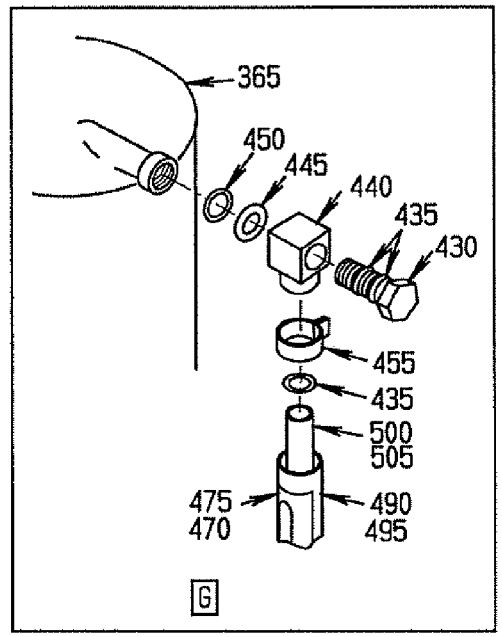
Figure 8B:
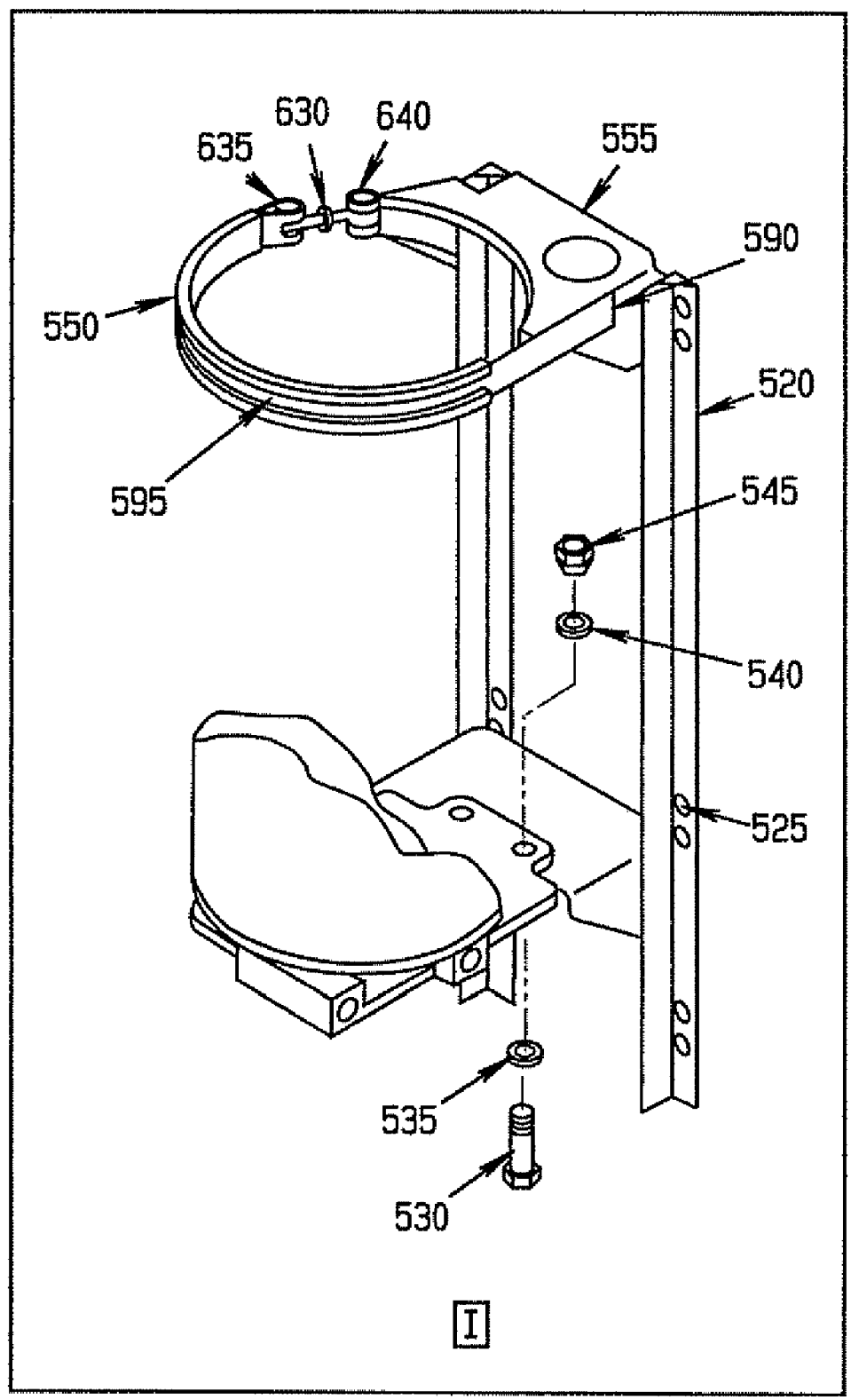

At step 46, the system 10 stores each detail found at step 44 in its own file 136 (FIG. 6). For example, the three details labeled G, H and I in FIG. 1 would each be written to their own files at step 46 as illustrated in FIGS. 8A, 8B and 8C.

At step 48 (FIG. 5A), the system 10 executes an assignment algorithm to assign and write the text recognized at step 38 to the appropriate detail file 136. Text assignment is preferably based upon geometric proximity reasoning (i.e., how close a particular text element is to a detail). The unambiguous text is preferably assigned before ambiguous text (i.e., those that cannot be assigned to a detail with high confidence). Each text element is preferably assigned to the detail to which its corresponding reference line is pointing.

Step 50 comprises a reference label recognition and erasure process during which the system 10 executes the module 16 and optical character recognition computer software. The input for the reference label recognition and erasure process 50 comprises the detail separated files 136. At step 50, the system 10 finds the text corresponding to the reference labels while allowing for at least some deviation in the characters.

Figures 7, 13:
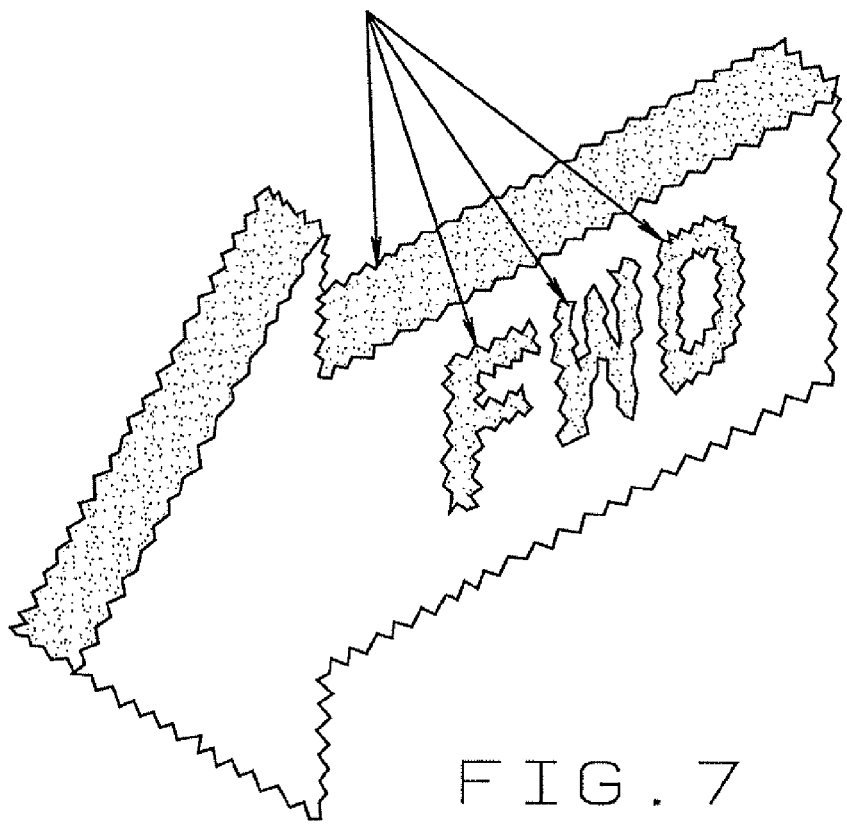
FIG. 7 is an exemplary raster image fragment in which four binary large objects have been identified.
FIG. 13 illustrates an exemplary location file containing item number, locator, detail and reference line information.

During the reference label recognition and erasure process 50, the system 10 first removes all large binary large objects at step 52 (i.e., the binary large objects that are too large to be characters) so that the same may be ignored during the reference label recognition and erasure process 50. Ignoring the large binary large objects substantially improves the system's 10 processing speed and accuracy during the reference label recognition and erasure process 50. As used herein, a "binary large object" (BLOB) is a grouping of all visible pixels that are connected, either horizontally, vertically or diagonally, to one or more other visible pixels in the grouping. A visible pixel is a pixel whose color is different than that of the background color of the image. In FIG. 7, there is shown an illustration of an exemplary raster image fragment in which four binary large objects or blobs have been identified.

Referring back to FIG. 5A, step 54 comprises character recognition during which the system 10 runs a character recognition engine on the remaining "small" blobs (i.e., those binary large objects or blobs that are not too large to be characters). During step 54, the system 10 accesses the data within the character sets 25, 26, and 27 to locate the characters within the detail separated files 136.

Figure 9:
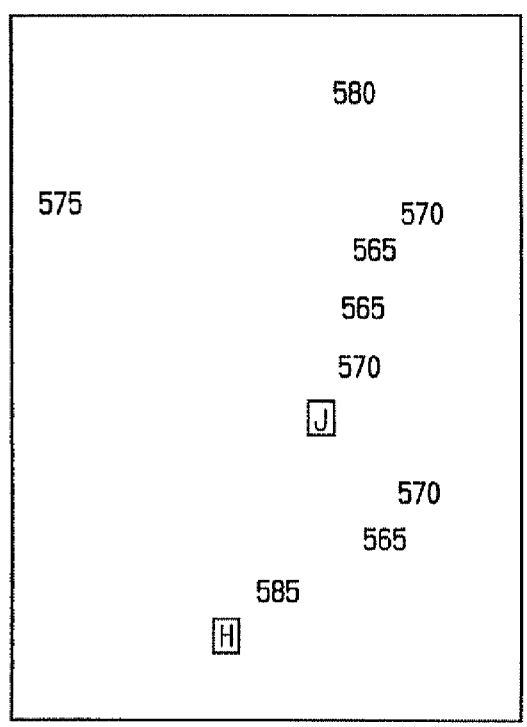
FIG. 9 illustrates the reference labels recognized and removed from the image shown in FIG. 8A.

At step 56, the system 10 uses the output from the character recognition step 54 to find reference labels, classifying them as item numbers, locator labels or detail labels. FIG. 9 shows the reference labels that were found in FIG. 8A by the system 10.

At step 58 (FIG. 5A), each recognized reference label and its respective placement or position on the image is captured or stored in an intermediate version of the raster file. The pixels representing each reference label are then erased or scrubbed from the images at step 60 to produce reference label scrubbed raster files 160 (FIG. 6).

Referring now to FIG. 5B, step 62 comprises a line recognition and erasure process during which the system 10 executes module 18 to identify, store, and erase the reference lines associated with the reference labels. The input for the line recognition and erasure process 62 comprises the reference label scrubbed raster files 160 (FIG. 6).

Figure 10:
FIG. 10 is an illustration of an exemplary pixel run.

At step 64 (FIG. 5B), the system 10 builds an ordered list of pixel runs from a reference label scrubbed raster file 160. As used herein, a "pixel run" is a grouping of pixels that are adjacent horizontally and share the same y-coordinate, as shown in FIG. 10. The initial runs built at step 64 each have a height of one (1) pixel but may have varying lengths or widths depending on how many adjacent pixels are found. A typical raster image may include tens of thousands of pixel runs.

Figures 11A, 11B:
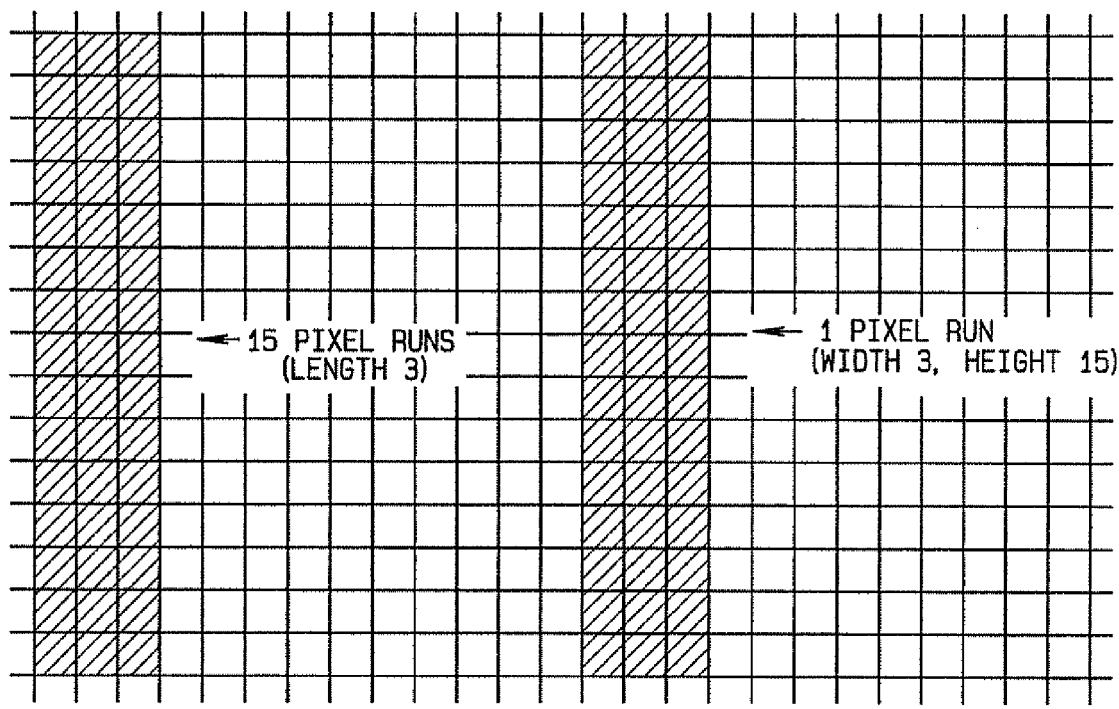
FIG. 11A illustrates fifteen (15) pixel runs that can be merged to form the single pixel run shown in FIG. 11B.
FIG. 11B illustrates the single pixel run formed from the merger of the fifteen (15) pixel runs shown in FIG. 11A.
Figure 12:
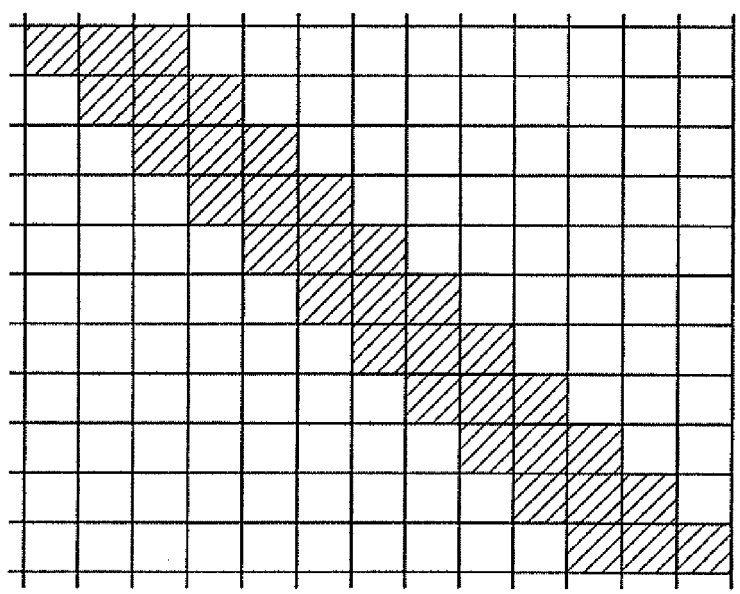
FIG. 12 shows an exemplary collection of eleven pixel runs forming an oblique line.

At step 66 (FIG. 5B), the pixel runs having identical x-coordinates and adjacent y-coordinates are merged. When a run is merged with another run it is removed from the list of runs. The remaining run is modified so that it is now "thicker" or "taller" than it was before the merge. For example, FIG. 11A shows fifteen (15) pixel runs, each having a width or length of three (3) pixels and height of one (1) pixel, that can be merged to form the single pixel run of width three (3) pixels and height of fifteen (15) pixels shown in FIG. 11B. Accordingly, horizontal lines are merged runs whose widths exceed their heights while meeting a minimum length requirement, whereas vertical lines are merged runs whose heights exceed their widths while meeting a minimum length requirement. Oblique lines are made of pixel runs that are "staircased", as shown in FIG. 12.

At step 68 (FIG. 5B), the system 10 searches for starting positions for reference lines by searching for pixels in the immediate proximity to where reference labels were recognized at step 50. That is, a line start is located by finding a pixel run in the immediate proximity to where a reference label was located. Once found, the pixel run is used as a starting point or seed by the system 10 to locate adjacent pixel runs that also proceed in the substantially same direction and along a substantially constant slope as the starting pixel run. When the system 10 cannot locate anymore of such adjacent pixel runs, a determination is made as to whether the collection of pixel runs, now forming a line, is sufficiently long enough for consideration as a reference line. If not, the system 10 selects another pixel run for use as starting point or seed and builds collection of pixel runs therefrom in the manner just described.

It should be noted that the resolution for the raster illustrated parts images being converted may vary depending on the particular application in which the present invention is being used. Accordingly, the determination of when a collection of pixel runs is long enough for consideration as a reference line will also vary depending on the particular application in which the present invention is being used. By way of example only, a reference line might be required to be at least five to ten percent (5-10%) coverage of the artwork.

In the illustrated embodiment, the system 10 tests at step 70 for the presence of an arrowhead at the end of each potential reference line (i.e., the pixel run collections that are sufficiently long enough to be considered a reference line). The system 10 works backward from a line stopping point and looks for pixel runs forming an arrowhead shape. If an arrowhead is found, the object (i.e., the line and arrowhead) is considered a valid reference line. After a valid reference line is located for a reference label, the system 10 may continue searching for other reference lines for the reference label because a single reference label may have more than one reference line associated therewith, as shown for the item number 435 in the detail labeled G in FIG. 1.

If no arrowhead is found for a line at step 70, the system 10 does not consider the line to be a reference line. The system 10 does, however, continue testing other lines for arrowheads. It should be noted, however, that the system 10 can also be configured to search for other types of lines, such as lines with bullets instead of arrows, lead lines (i.e., lines without end designators), etc.

At step 72, the system 10 writes one or more location files 172 (FIG. 6) that contain data and information about the text strings for reference labels as well as their respective image locations. The location files 172 also contain data and information pertaining to the start and end locations of each reference line. In FIG. 13, there is shown an exemplary location file wherein "IN" refers to Item Number, "LO" refers to Locator, "DL" refers to Detail and "LL" refers to Leader Line.

Figure 14:
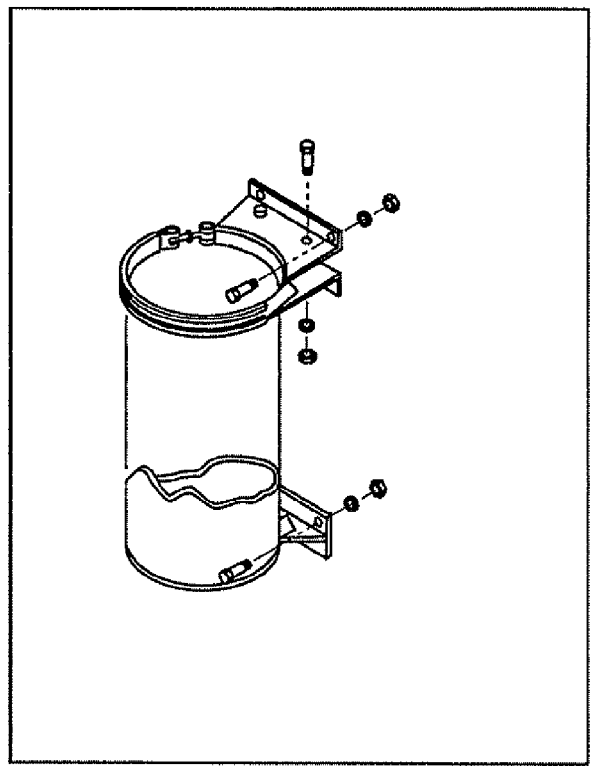
FIG. 14 is a reusable base graphic generated by the system shown in FIG. 3 for the image shown in FIG. 8A.

At step 73 (FIG. 5B), the system 10 creates the scrubbed files 173 (FIG. 6) containing the reusable base graphic(s) (e.g., FIG. 14) by erasing the pixels forming the reference lines, and accompanying arrowheads from the reference label scrubbed files 160. However, the system 10 looks for pixels adjacent to the reference line in order to avoid erasing pixels that are also part of or overlapping other objects on the image.

At step 74 (FIG. 5B), the system 10 executes the module 20 (FIG. 3) to reformat and standardize the scrubbed files 173 (FIG. 6). At step 76 (FIG. 5B), the system 10 executes the module 22 (FIG. 3) to convert the normalized scrubbed files 174 (FIG. 6) into vector files 176 that include the reusable base graphics as embedded bitmaps.

By way of example only, the system 10 may encode the vector files 176 in a file format called Computer Graphic Metafile (CGM), a widely-used technical illustration format. Alternatively, however, other languages and file formats may be used by the system 10 to encode the vector files 176 including, but not limited to, DWG format, document exchange format (DXF), initial graphics exchange specification (IGES) format, among others.

Figure 15:
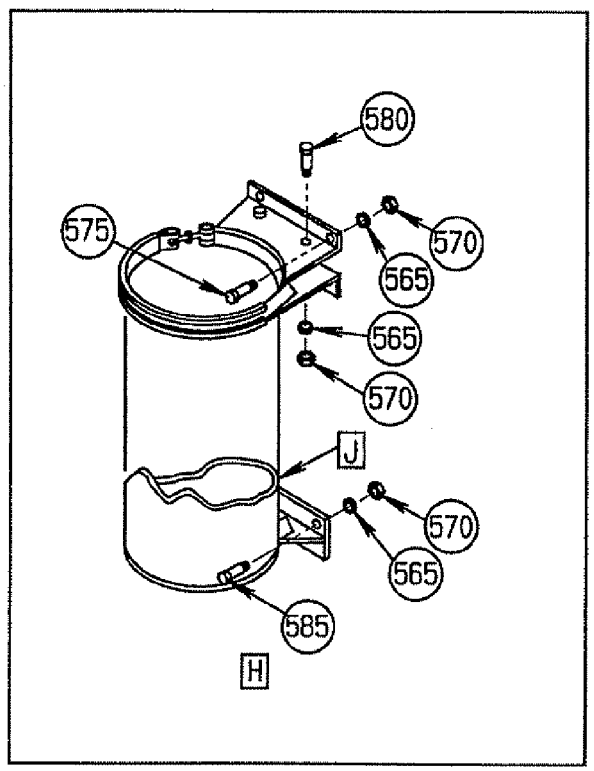
FIG. 15 is an illustration of an intelligent vector-layered image with all layers activated and that is generated by the system shown in FIG. 3 from the image shown in FIG. 8A.

At step 78 (FIG. 5B), the system 10 executes the module 24 (FIG. 3) to create the intelligent vector-layered files 178 (FIG. 6). That is, the system 10 reintroduces into the vector files 176 the reference labels and their associated reference lines as vector elements with each reference label being within a separate vector layer. As used herein, a "vector layer" shall be construed to include one or more vector elements that can be dynamically rendered or hidden at run-time under program control. As evident by comparing FIGS. 8A and 15, the intelligent vector-layered image (FIG. 15) appears substantially identical to the original raster image shown in FIG. 8A when all layers of the intelligent vector-layered image are turned on.

During step 78 (FIG. 5B), the system 10 accesses the location files 172 (FIG. 6) and uses the information contained therein to create a separate vector layer for each reference label and its corresponding reference line(s). Accordingly, in the illustrated embodiment, each vector layer contains the lines emanating from the reference label, a polygon for the arrowhead at the end of each line, and a circle (for item numbers) or rectangle (for locator and detail labels) at the location of the reference label. Appropriate vector elements may be used to encapsulate the circle or rectangle so that it becomes a hotspot upon which a user can click to access the corresponding part information or detail. The text strings for the reference labels in the corresponding vector layers are located in substantially identical positions as they were in the original raster illustrated parts image 11.

Upon completion of step 78, the intelligent vector-layered files 178 may be saved on a suitable computer readable medium at step 80 (FIG. 5B). Alternatively, or additionally, the intelligent vector-layered files 178 may be output at step 82, for example, to a graphical display.

The reference labels and their reference lines may also be encoded in extensible markup language (XML). In addition, the intelligent vector-layered files 178 preferably comprise CGM Version 4 files, which allow for the control of vector layers by existing graphic display software and allow vector layers to be made visible individually or as a group. Alternatively, however, other languages and file formats may be used for the intelligent vector-layered files.

In any event, the intelligent vector-layered files 178 allow document authors to control what layers are visible and when. Thus, one raster illustrated parts image with tens or hundreds of items may be reused repeatedly while displaying only the items applicable to a particular step in the task list, as shown by comparing FIG. 4A (identifying all reference labels) and FIG. 4B (identifying reference labels relevant to a particular step).

Figure 16A:
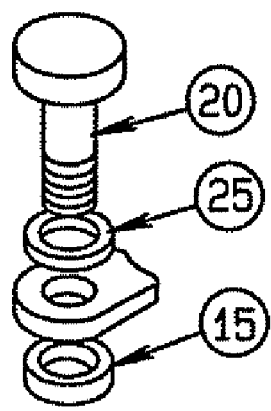
FIGS. 16A and 16B are intelligent vector-layered image fragments with items identified with and without item numbers, respectively.
Figure 16B:
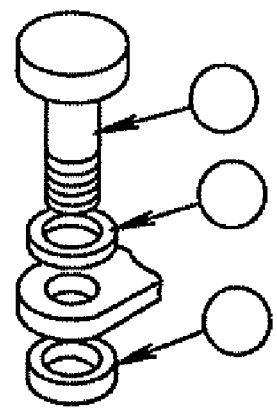

Referring now to FIG. 16A, item number text may be included as an aid when document authors are working with the intelligent vector-layered images. Document authors might need to know what each item number refers to because item number text is typically an index into a database parts table. However, it is usually not necessary for the item number text to be displayed (FIG. 16B) for users viewing the illustrated parts images with an electronic information system because the electronic information system can perform the table lookup and return the results automatically, thus eliminating the need for the users to know the item number text or do the cross-referencing manually.

The system 10 preferably comprises a batch conversion processor and thus does not require significant human intervention or manual re-authoring of the raster images. Accordingly, the present invention provides a more practical and cost-effective solution to the task of converting raster illustrated parts images to intelligent vector-layered files than the solutions presently recognized in the art, such as manually re-authoring or converting illustrated parts drawings with commercially available tools.

By accurately and quickly converting caster illustrated parts images to intelligent vector-layered files, the present invention dramatically improves the usability of the data within illustrated parts drawings. For example, the intelligent vector-layered files are suitable for integration with other intelligent graphics capabilities, advanced and efficient user interaction, among other functional capabilities.

In addition, the present invention is highly accurate in recognizing reference labels and reference lines from raster images. Indeed, the present invention provides a high quality but inexpensive approach for converting paper and raster illustrated parts drawings into intelligent vector-layered drawings. The present invention also eliminates, or at least reduces, the need for paper-based deliveries of illustrated parts drawings in that paper-based illustrated parts drawings can be scanned and then converted by the present invention to intelligent vector-layered drawings.

It is anticipated that the invention will be applicable to any of a wide range of raster graphics. Accordingly, the specific references to raster illustrated parts images herein should not be construed as limiting the scope of the present invention, as the invention could be applied to convert other raster images to intelligent vector-layered images, including but not limited to assembly instructions for consumer products, assembly instructions in the automotive industry, among others.

The description of the invention is merely exemplary in nature and, thus, variations that do not depart from the substance of the invention are intended to be within the scope of the invention. Such variations are not to be regarded as a departure from the spirit and scope of the invention.

What is claimed is:

1. A method for separating details of a raster illustrated parts image, comprising:
    recognizing text within the raster illustrated parts image;
    removing the recognized text from the raster illustrated parts image;
    analyzing the raster illustrated parts image to identify and group together pixels that comprise artwork forming a detail of the raster illustrated parts image, to enable details of the raster illustrated parts image to be parsed as part of separate detail files;
    assigning each detail of the raster illustrated parts image to its own detail file;
    assigning each text element of the recognized text to a detail file based on a correspondence between the text element and a reference line, if any, pointing to a raster illustrated parts image detail assigned to the detail file;
    removing reference labels and reference lines from the detail files to obtain scrubbed files each including a reusable base graphic; and
    converting each scrubbed file to a vector layered file in which each reference label is in a separate vector layer;
    the vector layers controllable to selectively display one or more of the reference labels with the reusable base graphic;
    the method performed by one or more processors using memory configured with the one or more processors.

2. The method of claim 1, wherein analyzing the raster illustrated parts image comprises using geometric proximity-based calculations together with recognized detail labels in said raster illustrated parts image.

3. The method of claim 1, wherein for each detail, the corresponding reusable base graphic is embedded in the corresponding vector file.

4. The method of claim 1, further comprising making a reference label location indicator in a vector layer selectively activatable by a user to obtain part information corresponding to the reference label.

5. The method of claim 1, wherein the operations of recognizing and removing the recognized text comprise using optical character recognition and at least one predefined character set associated with the raster illustrated parts image.

6. The method of claim 5, wherein using at least one predefined character set comprises using a character set of at least one of:
    detail labels;
    locator labels; and
    item numbers.

7. The method of claim 6, wherein assigning the recognized text comprises using geometric proximity reasoning, and a detail label of said raster illustrated parts image as a starting point, to assign the recognized text to a corresponding one of said detail files.

8. The method of claim 7, wherein assigning the recognized text comprises assigning less ambiguous recognized text before assigning more ambiguous recognized text.

9. The method of claim 1, further comprising linking the vector layers with steps in a task list.

10. A method for separating details of a raster illustrated parts image, comprising:
    a) recognizing and removing text from the raster illustrated parts image by using optical character recognition and at least one character set associated with the raster illustrated parts image;
    b) detecting and parsing the details of the raster illustrated parts image using geometric proximity-based calculations and detail labels recognized in operation a);
    c) storing each detected and parsed detail in a corresponding detail file;
    d) assigning each text element of the recognized text to a corresponding detail file using geometric proximity reasoning;
    e) removing reference labels from the detail files to obtain reference-label-scrubbed files;
    f) using an ordered list of pixel runs, removing reference lines from the reference-label-scrubbed files to obtain scrubbed files each including a reusable base graphic; and
    g) converting each scrubbed file to a vector layered file in which each reference label and corresponding reference line is in a separate vector layer;

the vector layers controllable to selectively display one or more of the reference labels with the reusable base graphic;

wherein the operations a), b), c), d), e), f) and g) are performed by one or more processors using memory configured with the one or more processors.

11. The method of claim 10, further comprising making a reference label location indicator in a vector layer selectively activatable by a user to obtain part information corresponding to the reference label.

12. The method of claim 10, wherein the operation of using one character set in operation a) comprises using one set of item numbers.

13. The method of claim 10, wherein the operation of using one character set in operation a) comprises using one set of detail labels.

14. The method of claim 10, wherein the operation of using one character set in operation a) comprises using one set of locator labels.

15. The method of claim 10, wherein the operation of recognizing and detecting text in operation a) comprises storing each text element of the recognized text and its corresponding location.

16. The method of claim 10, further comprising linking the vector layers with one or more steps in a task list.

17. A system for identifying and separating out details of a raster illustrated parts image, comprising:

one or more processors and memory configured with the one or more processors;

the memory having instructions stored thereon and executable by the one or more processors to:

recognize text within the raster illustrated parts image, and to separate details within the raster illustrated parts image into separate detail files;

assign each text element of the recognized text to a detail file based on a correspondence between the text element and a reference line, if any, pointing to a raster illustrated parts image detail assigned to the detail file;

remove reference labels and reference lines from the detail files to obtain scrubbed files each including a reusable base graphic;

convert each scrubbed file to a vector file in which the reusable base graphic is embedded; and add one or more vector layers to each vector file each vector layer controllable to selectively display a corresponding reference label and reference line with the reusable base graphic.

18. The system of claim 17, wherein said one or more processors and memory are configured to analyze the raster illustrated parts image to identify and group together pixels that comprise artwork forming a detail of the raster illustrated parts image, to enable details of the raster illustrated parts image to be parsed as part of separately formed detail files.

19. The system of claim 17, wherein the one or more processors and memory are configured to use optical character recognition to identify text within said raster illustrated parts image.

20. The system of claim 19, wherein the optical character recognition is used to identify at least one of the following: detail labels, locator labels, and item numbers present within said raster illustrated parts image.

* * * * *